Patented Feb. 8, 1949

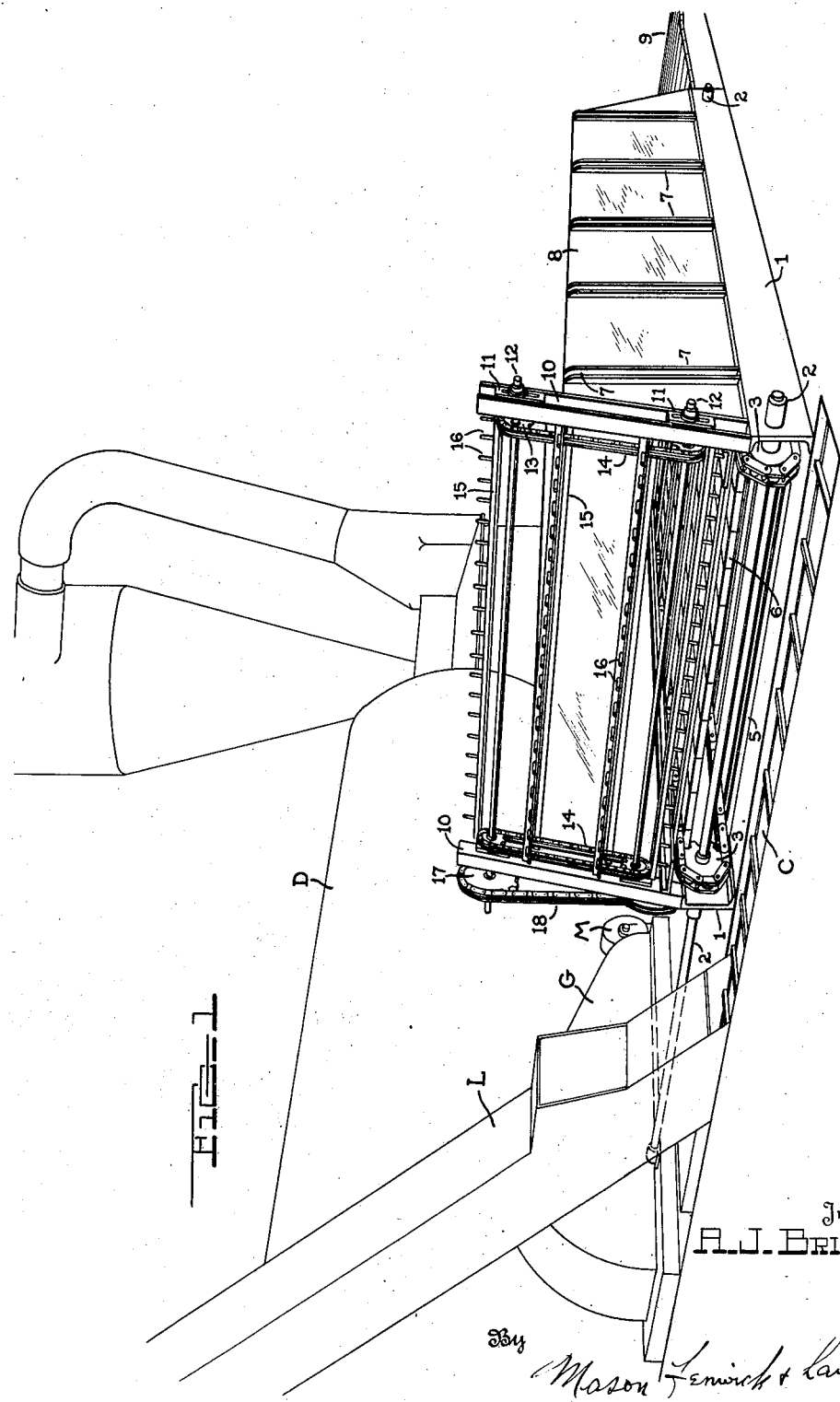

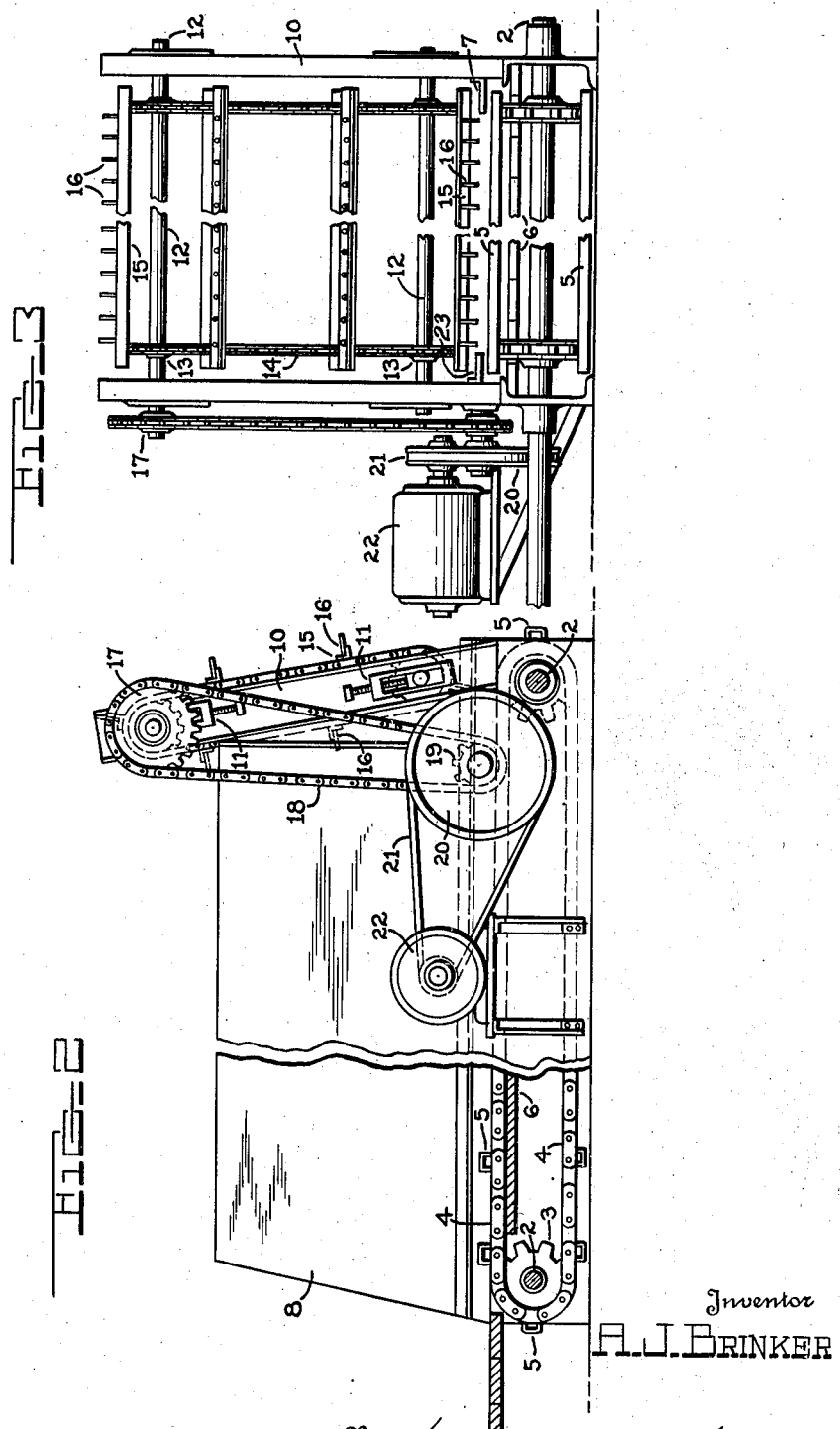

2,460,920

UNITED STATES PATENT OFFICE 2,460,920

SELF-FEEDING CONVEYER

Arthur John Brinker, Lexington, Nebr.

Application January 2, 1946, Serial No. 638,611

5 Claims. (Cl. 198—102)

This invention relates to an apparatus for feeding newly mown alfalfa to a dehydrating plant such as are now commonly in use in connection with the preparation of stock feed.

An object of the invention is to provide an automatic feeding device which will feed to the conveyor or elevator of the dehydrating plant a substantially uniform capacity supply of the newly mown alfalfa, thus eliminating the manual labor and assuring the operation of the dehydrating plant at maximum efficiency.

A further object of the invention is to provide a device of the character indicated of such structure and capacity as to permit the rapid deposit of successive loads of the newly mown alfalfa from trucks without regard to the feeding of the dehydrating plant but so arranged that the stock pile thus deposited will be uniformly and continuously advanced and fed to the dehydrating plant conveyor in a uniform manner and to the full capacity of the dehydrating plant, thus assuring the operation of the plant at maximum efficiency and without delaying the prompt unloading of the trucks.

Further objects of the invention will more particularly appear in the course of the following detailed description.

The invention consists in the novel construction, arrangement, and combinations of parts hereinafter more particularly described and claimed.

Two sheets of drawings accompanying this specification as part thereof, in which like reference characters indicate like parts throughout.

In the drawings:

Fig. 1 is a perspective view of the improved feeder device arranged in operative relationship to a dehydrating plant and the conveyor and elevator normally associated with such a plant.

Fig. 2 is a side elevation of the improved device partly broken away on a vertical longitudinal section.

Fig. 3 is a front end elevation of the machine.

In the light of the discovery in recent years of the fact that food properties of hay are materially conserved by the rapid dehydration of the hay rather than the sun curing thereof, large dehydrating plants have been erected in favorable locations adjacent the large scale growing of suitable hay crops such as alfalfa.

Normally, these dehydrating plants include a drying retort associated with a grinding mill with suitable blowing apparatus to carry the dehydrated and ground hay to a sacking department.

To secure the maximum food value in the feed it is essential that the raw material be supplied directly from the field to the dehydrator so that its moisture content can be eliminated rapidly and to accomplish the feeding of the raw material to the dehydrator as it is brought from the fields and deposited over the dehydrator conveyor C from the trucks, it has been necessary to employ several laborers with pitch forks to feed these deposits to the dehydrator. Such manual feeding is open to many objections. It involves high labor costs and is an arduous task for the men. Unless constant attention is paid to the work the dehydrator is not fed to its maximum capacity or, conversely, it is choked, or its elevator choked by too great a supply.

The present invention has been designed to provide an automatic feeder to the dehydrating plant which will permit the irregular deposit of truck loads of raw material entirely without regard to the dehydrating plant and which will automatically feed to the dehydrator conveyor and elevator a uniform supply to maintain the dehydrator operating at maximum efficiency.

Referring to the drawings, the dehydrating plant is indicated generally by the letter D with which dehydrating plant is associated an elevator L which is fed by a conveyor C operating on ground level. These features are common in plants now in existence and, as indicated above, the process up to now has contemplated the dumping of the raw material on, or adjacent, the conveyor C to which it is fed by pitch forks by several men.

The present invention contemplates a device consisting generally of two frame members 1—1 suitably associated by transverse frame members (not shown). These frame members 1—1 are positioned at right angles to the dehydrator conveyor C and preferably extend parallel with each other a substantial distance depending in length on the capacity of the plant.

Rigidly associated with the upper face of the edge of the frame members 1—1 are vertical stanchions 7 supporting side walls 8 and at the rear end of the frame members 1—1 is arranged an inclined platform 9 upon which trucks can back to dump their loads of newly mown alfalfa between the side walls 8.

Supported between the side frame members 1—1 is a platform 6 extending the full width and length of the frame members and journalled in the frame members, adjacent each end thereof, are two transverse shafts 2—2 having sprockets 3 mounted rigidly thereon between the frame members on which sprockets 3 are mounted endless chains 4 positioned one adjacent each side wall 8.

The chains 4—4 are connected by transverse sweeper rods 5 and these chains are arranged so that their upper reaches extend over, and one on each side of, the platform 6 with the sweeper rods 5 extending transversely over said platform.

One of the shafts 2 upon which the sweeper chains are mounted is extended to a suitable gear reduction device G of standard construction to which power is supplied as from a motor M.

On the end of the frame members 1—1 adjacent the dehydrator conveyor C are mounted upright standards 10—10, which as herein illustrated, are preferably inclined rearwardly over platform 6 and in which standards are mounted adjustable journals 11—11 carrying transverse shafts 12—12 which extend transversely of the frame members 1—1 the full width of the device. On these parallel spaced shafts 12—12 are mounted sprocket wheels 13 and these sprocket wheels at each side of the device carry endless chains 14, these endless chains being connected by transverse rods 15, the ends of which are rigidly associated with links of these chains. Each of these rods 15 is further provided with a plurality of outwardly directed spaced fingers 16 which are always outwardly directed with respect to their support chains.

One of the shafts 12 is provided with a driving sprocket 17 associated with a chain 18 which passes over a sprocket 19 associated with a driving pulley 20 which is associated by a V-belt 21 with a driving motor 22. Suitable stub shafts for these driving gears and pulleys are provided and supported from the main framework of the device.

In operation, the gearing selected for the driving of the sweeper shafts 2—2 is such as to drive the sweeper chains 4—4 at a speed much less than that provided by the gearing 17, 19 for driving the chains 14—14 and the power is applied in such manner that the upper reaches of the sweeper chains 4 will pass over the platform 6 from the rear open end of the platform toward the end adjacent the dehydrator conveyor C and also toward the chains 14—14. The latter chains are driven in a clock-wise direction as herein illustrated in Figure 1 so that the inner reaches will descend and the fingers on the bottom connecting rod 15 will pass outwardly from the platform, thus depositing the material on the conveyor C. Shelf-like guards extend lengthwise of and are secured to the inner faces of the walls 8—8 to project inwardly over the ends of sweeper rods 5 to prevent clogging between the walls and the chains 4—4. Shelf-like guards 23 extend lengthwise of and are secured to the inner faces of the walls 8—8 to project inwardly over the ends of sweeper rods 5 to prevent clogging between the walls and the chains 4—4.

In the normal operation of the device it will be apparent that loads of the newly mown alfalfa as deposited on the platform 6 adjacent the open end of the platform, will be continuously dragged from the bottom toward the conveyor C by the transverse sweeper rods 5 passing over platform 6 and that the forward end of this material will be continuously combed downwardly by the fingers 16 on the rods 15 to prevent any piling up of the material at the rear end of the platform and this material will be fed out between the end of the platform 6 and the lower fingers 16 of the lower rod 15 in a uniform layer which may be adjusted by controlling the motors M and 22 and the respective gears to provide a maximum amount of material to maintain the operation of the dehydrating plant at maximum efficiency.

Various modifications in the precise shape and arrangement of the parts to accommodate same to particular layouts of the dehydrating plant will readily suggest themselves to those skilled in the art but within the scope of the present invention as claimed.

Having thus fully described my invention, I claim:

1. In association with an alfalfa dehydrating plant having an elevator and a horizontally disposed endless conveyor adapted to introduce alfalfa deposited on said conveyor into the dehydrator plant, a feeding device comprising in combination a platform arranged at right angles to and with one end adjacent the dehydrator conveyor, side walls rigidly connected with said platform, spaced, parallel endless chains mounted to have their upper reaches pass above and adjacent the sides of the platform, spaced sweeper rods extending transversely of said chains and secured adjacent their ends thereto, upright standards at one end of the platform adjacent the conveyor, spaced parallel shafts having their ends journaled in said standards, sprockets mounted on said shafts, endless elevator chains, one adjacent each standard carried by said sprockets, spaced transverse rods rigidly associated with and connecting said elevator chains, each rod provided with a plurality of spaced outwardly directed fingers, means for driving the endless chains carrying the sweeper rods to advance their upper reaches toward the end standards, means for driving the chains carried by the end standards to advance the finger carrying rods downward on the side facing the platform, whereby material advanced over the platform by the sweeper rods will be raked downwardly and out from the platform onto the dehydrator plant conveyor in a uniform thin layer.

2. Device of claim 1 with the upright standards inclined rearwardly over the platform.

3. Device of claim 1 in which the sweeper rods, and the finger carrying rods are of substantially equal length and extend substantially the full width of the platform.

4. Device of claim 1 in which the driving means for the platform chains is synchronized with respect to the driving means for the elevator chains, to drive the latter more rapidly than the former.

5. Device of claim 1 with inwardly directed guards on the inner sides of the side walls extending lengthwise thereof above the sweeper chains and the ends of the sweeper rods.

ARTHUR JOHN BRINKER.

REFERENCES CITED

The following references are of record in the file of this patent:

UNITED STATES PATENTS

| Number | Name | Date |
|--------|------|------|
| 167,519 | Fowler | Sept. 7, 1875 |
| 586,778 | Marlow | July 20, 1897 |
| 767,162 | McNear | Aug. 9, 1904 |
| 1,526,704 | Hird | Feb. 17, 1925 |